M. Fishel,

Hoop Skirt.

No. 3730. Reissued. Nov. 16. 1869.

Witnesses.

C. C. Livings

Inventor.

Marks Fishel by his Attorney

United States Patent Office.

MARKS FISHEL, ADOLPH OPPER, AND LEO POPPER, OF NEW YORK, N. Y., ASSIGNEES OF MARKS FISHEL.

*Letters Patent No.* 34,182, *dated January* 14, 1862; *reissue No.* 3,730, *dated November* 16, 1869.

DIVISION A.

IMPROVEMENT IN SKELETON-SKIRTS.

The Schedule referred to in these Letters Patent and making part of the same.

*To all whom it may concern:*

Be it known that I, MARKS FISHEL, of New York, in the county and State of New York, have invented a certain new and useful Improvement in Hoop-Skirts; and I do hereby declare that the following is a full and exact description of the same, reference being had to the accompanying drawing, in which—

Figure 2 is a side view; and

Figure 3 is a horizontal section.

Similar letters of reference indicate corresponding parts in all the figures.

My invention relates to hoop-skirts having the tapes or analogous fabric woven as single goods, and consists in a novel construction and arrangement of the parts, whereby the hoops pass through holes produced at will in such single goods.

The hoops lie, alternately, one side and the other of the supporting-fabric, and never within it.

Unlike the skirts woven with pockets, the number and distance apart of the springs or hoops may be determined after the supporting-fabric is woven.

I prefer to fortify each of the holes against wear by introducing an eyelet, or analogous device, of metal or other durable material, having the hole in its interior of sufficient size to receive the strain.

To enable others to make and use my invention, I will proceed to describe its construction and operation, by the aid of the drawings.

A A A, &c., are the hoops of a skeleton-skirt, formed in any approved manner; and B B B are wide tapes, woven in any ordinary manner, which support the hoops A in their proper position. My invention relates entirely to the means of securing these at their intersections.

In the tapes B, at each point where the hoop crosses the said tape, I fix two or more eyelets, C C, and pass the hoop through the said eyelets.

Figure 1:
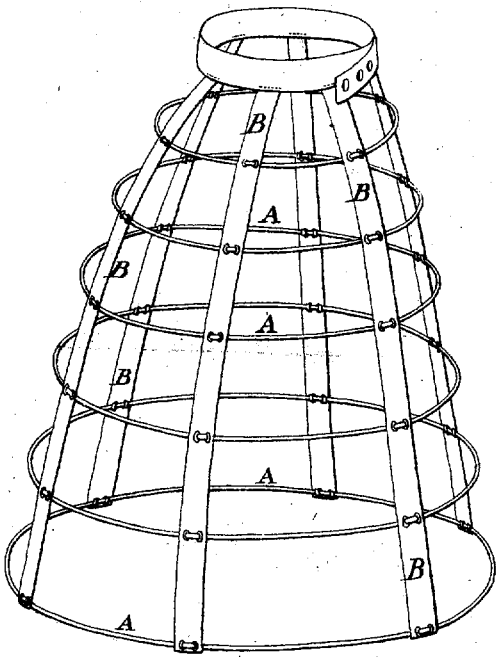
Figure 1 is a perspective view of a skeleton-skirt.
Figure 2:
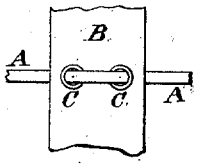
Figures 2 and 3 show, on a large scale, the mode of connecting the hoop to the fabric, which is the subject of this patent.
Figure 3:
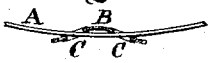

In figs. 2 and 3, the hoop is properly represented as passing through the eyelets. By this arrangement the hoop is well supported against falling down or getting otherwise entirely free from the tape. The hoop may be secured against sliding through the tape by any approved means not represented.

When the holes are provided with eyelets, as here shown, all the wear occasioned by any chafing or sliding motion of the hoop through the tape comes upon metal surfaces, and the construction is very durable.

I am aware that eyelets have been used in tapes for hoop-skirts, and that an eyelet connecting the clasp and tape has been shown in the patent granted to W. S. Thompson, September 21, 1858, but such device was not equivalent to mine, inasmuch as the hoop did not pass through the eyelet.

I am aware that pockets have been woven in tapes, and adapted to receive the hoops, but the relation of the hoops to the tape is different in such a case, and the number of the hoops, and their distance apart, cannot be varied, as in my invention, after the tapes are formed.

My tapes are woven plain, and the holes for the hoops may be formed at any height in the skirt, and as many and few, and with such distribution of spaces as may be desired.

I claim—

1. A supporting fabric for hoop-skirts, provided with holes C C, through which the hoops may be passed and be thereby sustained, passing inward and outward through the holes, substantially as and for the purposes herein set forth and described.

2. In connection with the above, the hard lining of the holes C C, to defend the fabric against destruction by the movement of the hoops therein, substantially as shown.

3. A hoop-skirt, having the hoops supported in holes formed and arranged in the supporting-material, substantially as herein set forth.

MARKS FISHEL.

Witnesses:
WM. FLINDT,
WM. C. DEY.